(12) United States Patent
Zhang et al.

(10) Patent No.: US 11,847,161 B2
(45) Date of Patent: Dec. 19, 2023

(54) DATA PROCESSING METHOD AND APPARATUS, DEVICE, AND STORAGE MEDIUM

(71) Applicant: BAIDU ONLINE NETWORK TECHNOLOGY (BEIJING) CO., LTD., Beijing (CN)

(72) Inventors: Anzhan Zhang, Beijing (CN); Jingying Qu, Beijing (CN); Wei Liu, Beijing (CN); Chang Liu, Beijing (CN); Zhengliang Chen, Beijing (CN); Guangdi Wan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 34 days.

(21) Appl. No.: 17/593,128

(22) PCT Filed: Oct. 15, 2020

(86) PCT No.: PCT/CN2020/121143
§ 371 (c)(1),
(2) Date: Sep. 9, 2021

(87) PCT Pub. No.: WO2022/000851
PCT Pub. Date: Jan. 6, 2022

(65) Prior Publication Data
US 2022/0342929 A1    Oct. 27, 2022

(30) Foreign Application Priority Data
Jun. 28, 2020   (CN) .......................... 202010600582.2

(51) Int. Cl.
*G06F 16/71* (2019.01)
*G06F 16/75* (2019.01)
*G06F 16/78* (2019.01)

(52) U.S. Cl.
CPC .............. *G06F 16/71* (2019.01); *G06F 16/75* (2019.01); *G06F 16/7867* (2019.01)

(58) Field of Classification Search
CPC ....... G06F 16/71; G06F 16/75; G06F 16/7867
(Continued)

(56) References Cited

U.S. PATENT DOCUMENTS

| | | | | |
|---|---|---|---|---|
| 4,409,655 A | * | 10/1983 | Wallach | G06F 12/14 |
| | | | | 711/E12.05 |
| 9,817,750 B2 | * | 11/2017 | Hayes | G06F 11/10 |

(Continued)

FOREIGN PATENT DOCUMENTS

| | | | | |
|---|---|---|---|---|
| AU | 2013210018 A1 | * | 8/2014 | ....... G06F 17/30073 |
| CN | 102955861 A | * | 3/2013 | |

(Continued)

OTHER PUBLICATIONS

International Search Report, International Search Authority, issued to Application No. PCT/CN2020/121143 dated Mar. 25, 2021, 5 pages.

(Continued)

*Primary Examiner* — Phuong Thao Cao
(74) *Attorney, Agent, or Firm* — HUNTON ANDREWS KURTH LLP (57) ABSTRACT

Provided are a data processing method and apparatus, a device, and a storage medium, which relate to the technical field of cloud computing and cloud platform. The specific implementation scheme includes: determining, according to logic information of first data acquired from an ordering tool, first physical addresses, where the first physical addresses are physical addresses of data shards in a physical data group associated with the first data; and sending the first (Continued)

```
┌─ S110
│ Determine first physical addresses according to logic information of first data
│ acquired from an ordering tool, where the first physical addresses are physical
│ addresses of data shards in a physical data group associated with the first data
└─

↓

┌─ S120
│ Send the first physical addresses to the ordering tool to cause the ordering tool to
│      order the first data according to the first physical addresses
└─
``` physical addresses to the ordering tool to cause the ordering tool to order the first data according to the first physical addresses.

17 Claims, 6 Drawing Sheets

(58) Field of Classification Search
USPC .................................................. 707/741
See application file for complete search history.

(56) References Cited

U.S. PATENT DOCUMENTS

| | | | |
|---|---|---|---|
| 10,216,949 B1* | 2/2019 | McKelvie | G06F 21/6218 |
| 10,545,667 B1* | 1/2020 | Magerramov | G06F 3/0607 |
| 2004/0148293 A1* | 7/2004 | Croisettier | G06F 16/2272 |
| 2013/0024460 A1* | 1/2013 | Peterson | G06F 3/064 |
| | | | 707/E17.049 |
| 2013/0326117 A1* | 12/2013 | Aune | G06F 3/064 |
| | | | 711/E12.008 |
| 2014/0059052 A1* | 2/2014 | Yamamoto | G06F 16/23 |
| | | | 707/741 |
| 2014/0250281 A1* | 9/2014 | Rao | G06F 12/0223 |
| | | | 711/156 |
| 2014/0379960 A1 | 12/2014 | Linkewitsch | |
| 2015/0348172 A1 | 12/2015 | Vasantham et al. | |
| 2016/0004631 A1 | 1/2016 | Hayes et al. | |
| 2016/0306832 A1 | 10/2016 | Hegde et al. | |
| 2017/0371707 A1 | 12/2017 | Zou et al. | |
| 2018/0232430 A1 | 8/2018 | Zhu et al. | |
| 2019/0036703 A1 | 1/2019 | Bestler | |
| 2019/0102515 A1* | 4/2019 | Chen | H03M 7/001 |
| 2019/0392047 A1* | 12/2019 | Sorenson, III | G06F 16/172 |
| 2021/0073123 A1* | 3/2021 | Huang | G06F 3/0644 |

FOREIGN PATENT DOCUMENTS

| | | | | |
|---|---|---|---|---|
| CN | 102968498 A | * | 3/2013 | ............ G06F 3/0611 |
| CN | 103098034 B | * | 11/2016 | ............ G06F 11/108 |
| CN | 106933935 A | | 7/2017 | |
| CN | 106940715 A | | 7/2017 | |
| CN | 107733709 A | | 2/2018 | |
| DE | 112011102076 T5 | * | 3/2013 | ............ G06F 3/061 |
| EP | 1193967 A2 | * | 4/2002 | ............ G06F 3/0611 |
| JP | H0566980 A | | 3/1993 | |
| JP | 2005190047 A | | 7/2005 | |
| JP | 2007164240 A | | 6/2007 | |
| JP | 2014529216 A | | 10/2014 | |
| JP | 2020511714 A | | 4/2020 | |
| WO | 2014101420 A1 | | 7/2014 | |

OTHER PUBLICATIONS

Extended European Search Report issued from the European Patent Office to EP Application No. 20916237.9 dated Apr. 8, 2022, 16 pages.
Japanese Office Action, Japan Patent Office, issued to Japanese application No. 2021-546329 dated Oct. 25, 2022, 13 pages.
First Chinese Search Report issued in Application No. 2020106005822, dated Jun. 5, 2023, 5 pages.
Chinese Office Action issued in Application No. 202010600582.2, dated Jun. 6, 2023, 11 pages.

* cited by examiner

DATA PROCESSING METHOD AND APPARATUS, DEVICE, AND STORAGE MEDIUM

CROSS-REFERENCE TO RELATED APPLICATIONS

This is a U.S. National Stage Application filed under 35 U.S.C. § 371 based on International Patent Application No. PCT/CN2020/121143, filed on Oct. 15, 2020, which claims priority to Chinese Patent Application No. 202010600582.2 filed on Jun. 28, 2020, the disclosures of both of which are incorporated herein by reference in their entireties.

TECHNICAL FIELD

The present application relates to the technical field of the Internet, in particular, to the technical fields of cloud computing and cloud platform, and specifically, to a data processing method and apparatus, a device, and a storage medium.

BACKGROUND

At present, search and recommendation have become the mainstream manners of content consumption of users. Whether it is graphics content or new media content such as clips, short videos, and long videos, these very-large-scale massive data need to be stored, indexed, and efficiently distributed to users in manners such as search and recommendation. With the rapid growth of content data, the scalability of traditional data management manners is restricted, and high online availability and performance have to be ensured through high machine costs and high operation and maintenance costs.

SUMMARY

The following is a summary of the subject matter described in detail herein. The summary is not intended to limit the scope of the claims.

The present disclosure provides a data processing method and apparatus, a device, and a storage medium.

According to an aspect of the present disclosure, a data processing method is provided. The method includes the steps described below.

First physical addresses are determined according to logic information of first data acquired from an ordering tool, where the first physical addresses are physical addresses of data shards in a physical data group associated with the first data.

The first physical addresses are sent to the ordering tool to cause the ordering tool to order the first data according to the first physical addresses.

According to an aspect of the present disclosure, a data processing method is provided. The method includes the steps described below.

Logic information of first data is sent to a data processing party to cause the data processing party to determine first physical addresses according to the logic information of the first data, where the first physical addresses are physical addresses of data shards in a physical data group associated with the first data.

The first data is ordered according to the first physical addresses.

According to an aspect, an electronic device is provided. The electronic device includes: at least one processor, and a memory communicatively connected to the at least one processor.

The memory has instructions executable by the at least one processor stored thereon, where the instructions are executed by the at least one processor to enable the at least one processor to perform the data processing method of any one of embodiments of the present application.

According to an aspect, a non-transitory computer-readable storage medium having computer instructions stored thereon is provided, where the computer instructions are used for causing a computer to perform the data processing method of any one of embodiments of the present application.

It is to be understood that the content described in this part is neither intended to identify key or important features of embodiments of the present disclosure nor intended to limit the scope of the present disclosure. Other features of the present disclosure are apparent from the description provided hereinafter. Other aspects will be apparent upon reading and understanding the drawings and detailed description.

BRIEF DESCRIPTION OF DRAWINGS

The drawings are intended to provide a better understanding of the scheme of the present application and not to limit the present application. In the drawings.

DETAILED DESCRIPTION

Exemplary embodiments of the present application, including details of embodiments of the present application, are described hereinafter in conjunction with the drawings to facilitate understanding. The exemplary embodiments are merely illustrative. Therefore, it will be realized by those having ordinary skill in the art that various changes and modifications may be made to the embodiments described herein without departing from the scope and spirit of the present application. Similarly, description of well-known functions and structures is omitted hereinafter for clarity and conciseness.

Figure 1A:
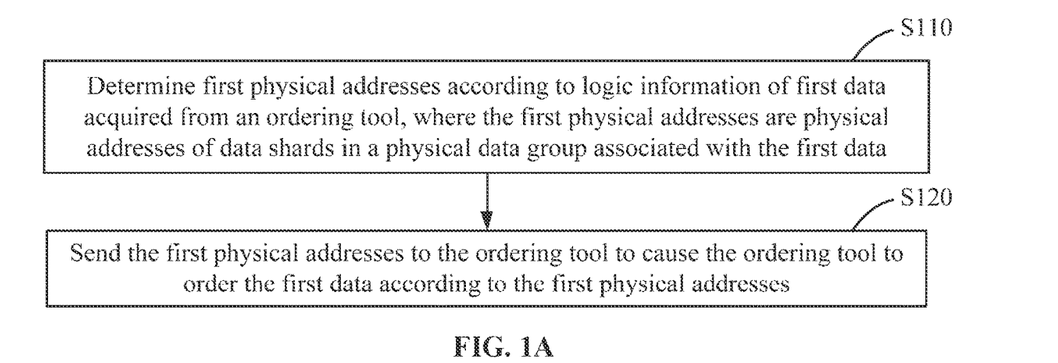
FIG. 1A is a flowchart of a data processing method according to an embodiment of the present application.

FIG. 1A is a flowchart of a data processing method according to an embodiment of the present application. This embodiment may be applied to the case of improving the resource occupation rate of data. The data processing method provided in this embodiment may be performed by an electronic device and specifically, may be performed by a data processing apparatus. The apparatus may be implemented by software and/or hardware and is disposed in the electronic device. With reference to FIG. 1A, the data processing method provided in this embodiment includes the steps described below.

In step S110, first physical addresses are determined according to logic information of first data acquired from an ordering tool, where the first physical addresses are physical addresses of data shards in a physical data group associated with the first data.

The ordering tool may be an ordering module in a search engine or in a push engine and configured to recall data in response to a user access request and ordering the recalled data. In order to facilitate the operation of recalling, the first data may be forward index data or reverse index data of traffic content. The logic information of the first data may be traffic category information under the traffic field to which the first data belongs. Taking traffic fields such as goods and novels as examples, goods may further include traffic categories such as purchases, articles, and big influencer images, and novels may further include traffic categories such as fantasy, martial arts, and romance.

In this embodiment of the present application, each traffic field may have a unique virtual data group, and different physical data groups may be built for different traffic categories under the traffic field, that is, one virtual data group may be associated with multiple physical data groups. The physical data group is used for storing content data under the associated traffic category. The virtual data group is a logical concept which is used for facilitating viewing the amount of the collated data of each traffic category in a traffic field, and there is no specific content data in the virtual data group.

According to the amount of the data of the physical data group, one physical data group may include a data shard or multiple data shards, and each data shard is used for storing a set of index data. An actual physical storage area and a computational central processing unit (CPU) logic core may be allocated to the data shard, and the data shard is the smallest unit that can independently provide services. It is to be noted that the physical address of the physical storage area allocated for the data shard is the physical address of the data shard. For example, the physical address of the data shard may be an identity (ID) and an Internet Protocol (IP) address of the physical storage area where the data shard is located.

In an embodiment, the ordering tool may determine logic information of to-be-accessed first data according to a user access request and send the logic information of the first data to the data processing party. The data processing party determines a physical data group associated with the first data and uses physical addresses of data shards in the physical data group as the first physical addresses. New data forms such as virtual data groups, physical data groups, and data shards are proposed, and the association relationship between these new data forms is determined, thereby simplifying the data processing process and thus improving the data processing efficiency. In addition, the preceding scheme can also facilitate the subsequent dynamic adjustment of data resources, thereby improving the resource utilization.

In step S120, the first physical addresses are sent to the ordering tool to cause the ordering tool to order the first data according to the first physical addresses.

The first physical addresses may be a physical address of one data shard in the physical data group associated with the first data, or may be physical addresses of multiple data shards in the physical data group associated with the first data. In an embodiment, the ordering tool may access a data store associated with the first physical addresses, recall the first data, and order the recalled first data.

Figure 1B:
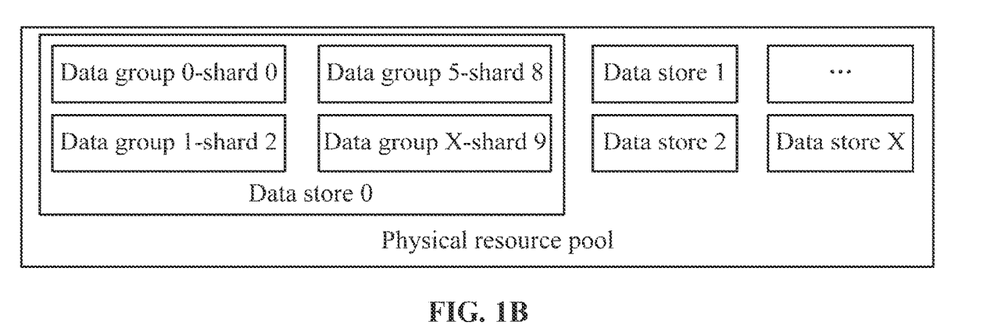
FIG. 1B is a structure diagram of a physical resource pool according to an embodiment of the present application.

FIG. 1B is a structure diagram of a physical resource pool according to an embodiment of the present application. With reference to FIG. 1B, a physical resource pool may include multiple data stores, one data container may run one data store or may run multiple data stores. According to different resource allocation strategies, one data store may store one data shard or may store multiple data shards, and the multiple stored data shards may belong to different physical data groups. It is to be noted that the data storage and the data container are decoupled so the data can be dynamically managed without relying on manual operation, thereby reducing the labor cost.

In an optional implementation, data shards in the same physical data group are stored in different data stores, and data shards in different physical data groups are stored in the same data store. With the adoption of the affinity strategy, data shards are allocated for physical data groups without being constrained by data packets or data stores, and data stores are allocated for data shards only from the perspective of resources, which can improve the convenience of the data processing.

According to the technical scheme of the embodiment of the present application, the data is processed through the new data forms, which can improve the convenience of the data processing and the resource utilization of the data.

Figure 2A:
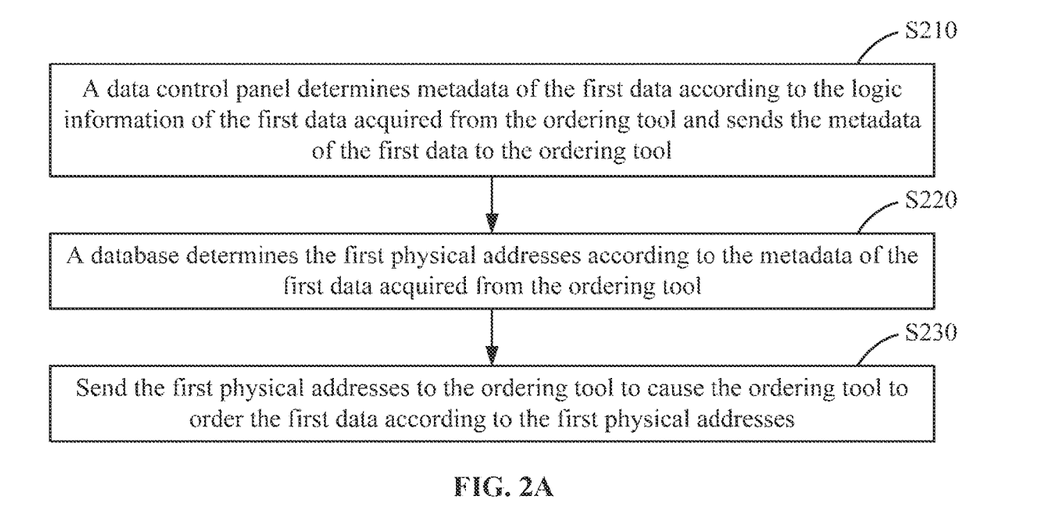
FIG. 2A is a flowchart of a data processing method according to an embodiment of the present application.

FIG. 2A is a flowchart of a data processing method according to an embodiment of the present application. This embodiment is an optional scheme provided on the basis of the preceding embodiment. With reference to FIG. 2A, the data processing method provided in this embodiment includes the steps described below.

In step S210, a data controller determines metadata of the first data according to the logic information of the first data acquired from the ordering tool and sends the metadata of the first data to the ordering tool.

Figure 2B:
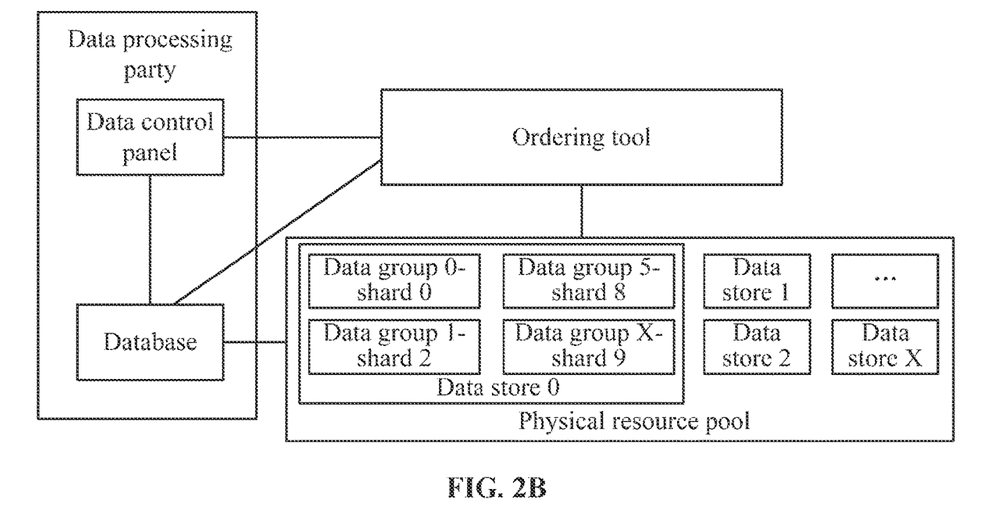
FIG. 2B is a structure diagram of a data processing party according to an embodiment of the present application.

FIG. 2B is a structure diagram of a data processing party according to an embodiment of the present application. As shown in FIG. 2B, the data processing party may include a data controller and a database, where the data controller may be configured to manage physical data groups and data shards, such as how many data shards one physical data group needs to be divided into, and how many storage resources and computing resources one data shard needs. When the amount of data and flow are adjusted, the data controller may determine the optimal allocation scheme so that physical resources may be dynamically deployed and adjusted according to the optimal allocation scheme. In an embodiment, the data controller may communicate with the index data requesting part (such as the ordering tool) and the index data building part (such as a data builder described below) through a DCP software development kit (DCP SDK), adjust data shards in the physical data group, and manage the association relationship between the user request and the physical data group.

The metadata of the first data may be metadata logic information of the first data. The metadata of the first data is different, and the first data shards may be different, that is, the first physical addresses are different.

In an optional implementation, the metadata of the first data is version information of the data shards in the physical data group associated with the first data. In an embodiment, in the initialization process, according to the estimated amount of data of the traffic category associated with the physical data group, n1 data shards are allocated to the physical data group. With the dynamic adjustment of the data amount or the dynamic adjustment of the access amount, the number of the data shards in the physical data group is adjusted to n2, that is, the physical data group has version information of two different data shards. It is to be noted that the embodiment of the present application does not specifically limit the number of versions of data shards of the physical data group, and the version may be the latest version or may be in combination with a full version and an incremental version. Through the version information of data shards, the resources of the data may be quickly determined in the process of data resource dynamic adjustment, thereby improving the data processing efficiency.

In an embodiment, the data controller acquires the logic information of the first data from the ordering tool, determines a physical data group (which can be referred to as the first physical data group) associated with the first data according to the preset association relationship between the logic information and the physical data group, and determines metadata of the first physical data group.

In step S220, a database determines the first physical addresses according to the metadata of the first data acquired from the ordering tool.

With reference to FIG. 2B, the database is configured to store the association relationship between virtual data groups, physical data groups, data shards, and physical addresses and the association relationship between logic information of data, metadata of data, and physical addresses of data. Metadata or logic information is decoupled with physical data and the data controller so that the database can quickly manage resources. For example, the database quickly queries the amount of data of the virtual data group and the quickly acquires the latest-version data shards in the physical data group and the physical addresses of the latest-version data shards.

In an embodiment, the metadata of the first data is matched with the association relationships stored in the database to obtain the first physical addresses.

In step S230, the first physical addresses are sent to the ordering tool to cause the ordering tool to order the first data according to the first physical addresses.

According to the technical scheme of the embodiment of the present application, the data controller cooperates with the database, thereby improving the data processing efficiency.

Figure 3A:
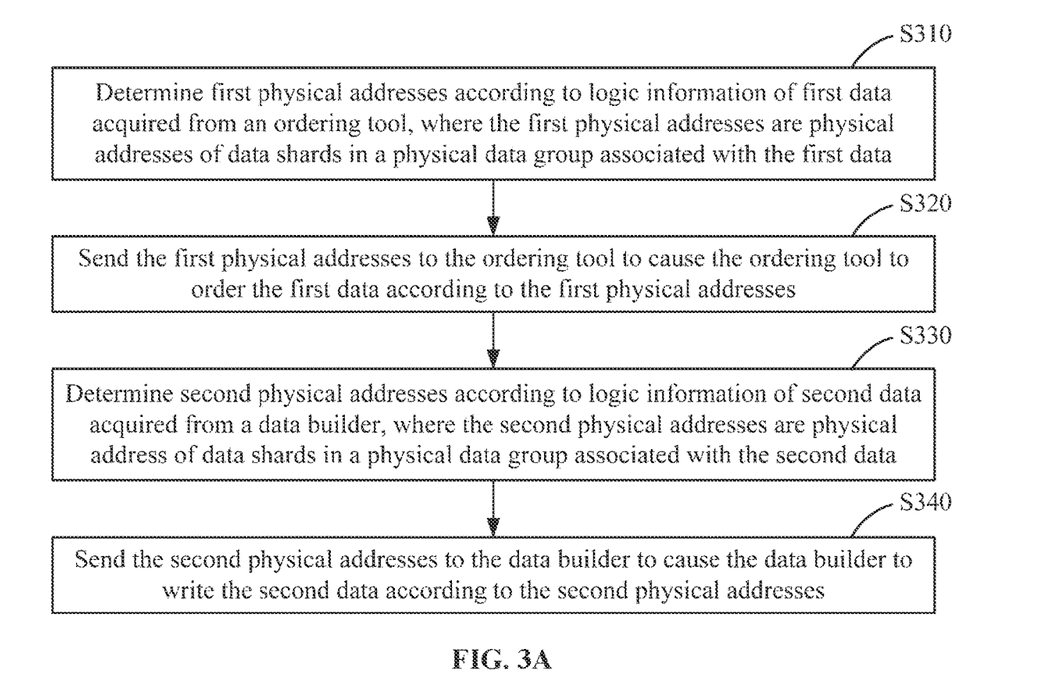
FIG. 3A is a flowchart of a data processing method according to an embodiment of the present application.

FIG. 3A is a flowchart of a data processing method according to an embodiment of the present application. This embodiment is an optional scheme provided on the basis of the preceding embodiments. With reference to FIG. 3A, the data processing method provided in this embodiment includes the steps described below.

In step S310, first physical addresses are determined according to logic information of first data acquired from an ordering tool, where the first physical addresses are physical addresses of data shards in a physical data group associated with the first data.

In step S320, the first physical addresses are sent to the ordering tool to cause the ordering tool to order the first data according to the first physical addresses.

In an optional implementation, the first physical addresses include a full physical address of a full data shard in the physical data group associated with the first data and an incremental physical address of an incremental data shard in the physical data group associated with the first data, and used for causing the ordering tool to order the first data according to the incremental physical address and the full physical address. The incremental data shard may be a new data shard allocated for hot spot data. The hot spot data are written into the new data shard so that data migration of the entire physical data group is not required. When online access and offline data are built, a physical address of the hot spot data is returned, and the ordering tool may preferentially access the incremental data shard, thereby improving the access efficiency of hot spot data. Moreover, the number of copies of non-hot-spot data can also be reduced, thereby reducing the resource occupation.

In step S330, second physical addresses are determined according to logic information of second data acquired from a data builder, where the second physical addresses are physical address of data shards in a physical data group associated with the second data.

The data builder may be an index content builder. In an embodiment, after the data builder acquires the second data (that is, traffic data) from a traffic party, the logic information of the second data sent to the data processing party may be traffic category information under the traffic field to which the second data belongs. The second data may be the first data or may be other data.

In step S340, the second physical addresses are sent to the data builder to cause the data builder to write the second data according to the second physical addresses.

The second physical addresses may be a physical address of one data shard in the physical data group associated with the second data or may be physical addresses of multiple data shards in the physical data group associated with the second data. In an embodiment, the data builder performs processing such as data parsing, data format conversion, strategy calculation, and field weight determination on the traffic data to obtain index data of the traffic data, and writes the index data into data stores associated with the second physical addresses. It is to be noted that the second physical addresses may have physical addresses of multiple data shards, and index data may be written into at least one data shard in the second physical data group based on load balance.

The index data is written according to the new data forms such as physical data groups and data shards, which can improve the writing efficiency of the index data, thereby improving the access efficiency of index data. It is to be noted that steps S310 and S320 are data access operations, steps S330 and S340 are data building operations, and the data access operations and the data building operations may be performed in a manner of coordination according to traffic requirements.

In an optional implementation, step S330 includes the following step: a store controller determines, according to the logic information of the second data acquired from the data builder, metadata of the second data, and sending the metadata of the second data to the data builder; and a database determines, according to the metadata of the second data acquired from the data builder, the second physical addresses.

Figure 3B:
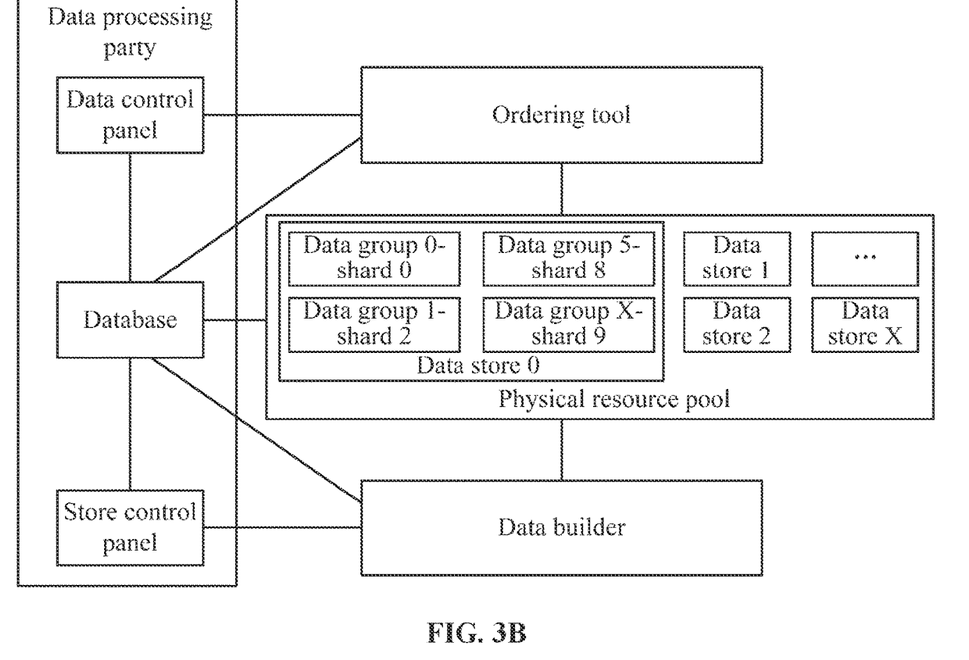
FIG. 3B is a structure diagram of a data processing party according to an embodiment of the present application.

FIG. 3B is a structure diagram of a data processing party according to an embodiment of the present application. As shown in FIG. 3B, the data processing party may include a data controller, a database, and a store controller, where the store controller is configured to dynamically deploy and adjust physical resources according to the resource allocation scheme of the data controller. The data controller performs resource allocation, and the store controller adjusts physical resources according to the resource allocation. The database is configured to store the resource allocation scheme and a physical resource scheme, that is, to decouple the data control strategy, data physical allocation, and metadata, thereby improving the data processing efficiency and causing the traffic to dispense with the need of paying attention to physical storage.

In an optional implementation, the metadata of the second data is version information of the data shards in the physical data group associated with the second data.

It is to be noted that in the initialization process of the traffic field or the initialization process of the traffic category in the traffic field, the data controller determines the resource allocation scheme, that is, the data controller determines virtual data group information of the traffic field, allocates physical data groups for the virtual data group, and allocates data shards for the physical data group. The store controller deploys the physical resources according to the resource allocation scheme, that is, the store controller determines the physical addresses of the data shards. The resource allocation scheme and physical resource deployment information, that is, the association relationship between virtual data groups, physical data groups, data shards, and physical addresses, are written into the database for the builder or the ordering tool to use.

According to the technical scheme of the embodiment of the present application, the data processing party cooperates with the ordering tool and the data builder, respectively, and performs data access and data building in data forms such as virtual data groups, physical data groups, and data shards, which can improve the data processing efficiency and the convenience of the data processing.

Figure 4:
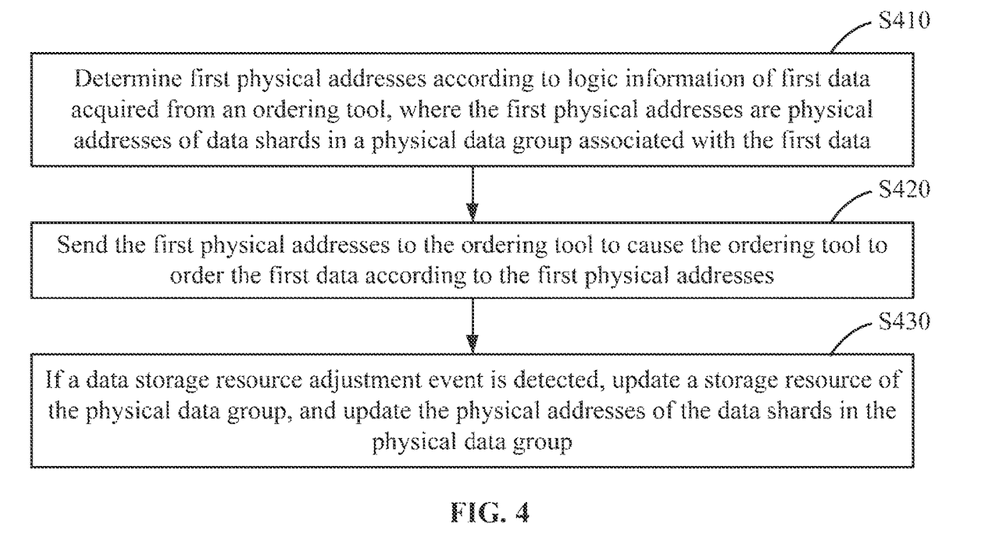
FIG. 4 is a flowchart of a data processing method according to an embodiment of the present application.

FIG. 4 is a flowchart of a data processing method according to an embodiment of the present application. With reference to FIG. 4, the data processing method provided in this embodiment includes the steps described below.

In step S410, first physical addresses are determined according to logic information of first data acquired from an ordering tool, where the first physical addresses are physical addresses of data shards in a physical data group associated with the first data.

In step S420, the first physical addresses are sent to the ordering tool to cause the ordering tool to order the first data according to the first physical addresses.

In step S430, if a data storage resource adjustment event is detected, a storage resource of the physical data group is updated, and the physical addresses of the data shards in the physical data group are updated.

According to the resource utilization or flow of data, whether to generate a data storage resource adjustment event is determined. In an embodiment, according to the acquired resource utilization of the data store, the resource utilization of the data shards, and the heat of the data, whether to expand or shrink the physical resources is determined. If the data processing party includes a data controller, a database, and a store controller. The data controller may be configured to determine a resource adjustment scheme, and the store controller may be configured to deploy the physical resources according to the resource adjustment scheme. The data resource is dynamically updated so that when the data scale changes and the user consumption flow changes, elastic self-adaptation can be achieved, and on the premise of ensuring high availability and high performance of the system, the machine cost can be greatly reduced without investing any manpower.

In an optional implementation, step S430 includes the following steps: if it is detected that a resource utilization of an original data shard in the physical data group is greater than a first resource utilization threshold, a new associated data shard is created for the original data shard in the physical data group; and data in the original data shard is divided into the original data shard and the new data shard, and a physical address of the original data shard and a physical address of the new data shard are used as the physical addresses of the data shards in the physical data group.

The first resource utilization threshold is a resource utilization upper limit value, which may be preset. For example, the first resource utilization threshold may be preset to 85%. If it is detected that the resource utilization of the original data shard in the physical data group is greater than the first resource utilization threshold, the data shards of the physical data group are increased. In order to achieve low-cost data migration without terminating services, the number of data shards is expanded according to multiples, that is, the number of new data shards is an integer multiple of the number of original data shards, and each original data shard is associated with at least one new data shard. The data of the original data shard is divided into the original data shard and the new associated data shard, and when any data in the original data shard is updated, the data and the updated data of the data may be written into the same data shard, thereby avoiding data version disorder caused by writing the data and the updated data of the data into different data shards, so that the ordering tool does not need to perform the deduplication operation, that is, the ordering tool is simplified.

In the data migration process, that is, in the process of data shard expansion, if the data builder generates new content data, the new content data is double written, that is, the new content data is written into both the original data shard and the new data shard. Therefore, both the original data shard and the new data shard have the new content data, that is, the new content data may be accessed in the data migration process and after the data migration is completed. It is to be noted that if the data migration is completed, the physical address of the original data shard and the physical address of the new data shard are both used as the physical addresses of the data shards in the physical data group, that is, the version information of the data shards in the physical data group is updated.

In an optional implementation, step S430 includes the following steps: if it is detected that a resource utilization of the data shards in the physical data group is less than a second resource utilization threshold, merging data of at least one data shard of the data shards in the physical data group into another data shard of the data shards in the physical data group, and deleting a physical address of the at least one data shard from the physical addresses of the data shards in the physical data group.

The second resource utilization threshold is a resource utilization lower limit value and is less than the first resource utilization threshold. If it is detected that the resource utilization of the data shards in the physical data group is less than the second resource utilization threshold, the data of at least one data shard in the physical data group is merged into another data shard in the physical data group, thereby reducing the number of data shards of the physical data group and reducing the resource occupation of the physical data group.

It is to be noted that if the data migration (that is, data shard expansion or shrinkage) is completed, the physical addresses of the data shards in the physical data group are adjusted, and accordingly, the version information of the data shards in the physical data group is updated.

In an optional implementation, step S430 includes the following steps: if hot spot data exists in a physical data group, the data storage resource adjustment event is detected; an incremental data shard is created for the physical data group, the hot spot data is written into the incremental data shard, and an original data shard in the physical data group is used as a full data shard in the physical data group; and a physical address of the incremental data shard is added into the physical data group.

The hot spot data is written into the new data shard so that data migration of the entire physical data group is not required. When online access and offline data are built, the data controller and store controller detect hot spot data and return the physical address of hot spot data without returning the physical address of the full data in the physical data group, thereby improving the efficiency of access and writing. Moreover, the number of copies of non-hot-spot data can be reduced, thereby reducing the resource occupation. Taking a popular fantasy novel as an example, an incremental data shard may be built for the popular fantasy novel in the physical data group associated with the fantasy novel, thereby improving the access efficiency of the popular fantasy novel.

In an optional implementation, step S430 includes the following steps: if it is detected that a resource utilization of a data store is greater than a third resource utilization threshold, a new data store is created; a new data shard in the physical data group is created in the new data store, and a physical address of the new data store is used as a physical address of the new data shard in the physical data group.

The third resource utilization threshold is the resource utilization upper limit value. In an embodiment, if it is detected that there are a few resources in the data store, that is, when the physical storage space required by the physical data group exceeds the storage space threshold that the current data store can actually provide, the store controller may dynamically expand a new data store and dynamically rebalance the data, thereby achieving the dynamic adjustment of the data store.

According to the technical scheme of the embodiment of the present application, when the data scale changes or the user flow changes, the elastic and self-adaptive data adjustment is performed, thereby improving the utilization of data resources and reducing the machine cost.

Figure 5:
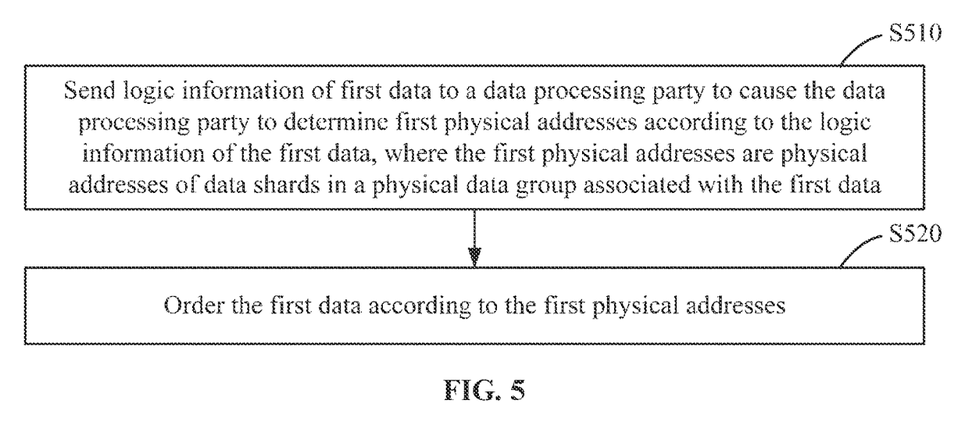
FIG. 5 is a flowchart of a data processing method according to an embodiment of the present application.

FIG. 5 is a flowchart of a data processing method according to an embodiment of the present application. The embodiment may be applied to the case of improving the data access efficiency. The data processing method disclosed in this embodiment may be performed by an electronic device and specifically, may be performed by a data processing apparatus. The apparatus may be implemented by software and/or hardware and is disposed in the electronic device. With reference to FIG. 5, the data processing method provided in this embodiment includes the steps described below.

In step S510, logic information of first data is sent to a data processing party to cause the data processing party to determine first physical addresses according to the logic information of the first data, where the first physical addresses are physical addresses of data shards in a physical data group associated with the first data.

The logic information of the first data may be traffic category information under the traffic field to which the first data belongs. Taking traffic fields such as goods and novels as examples, goods may further include traffic categories such as purchases, articles, and big influencer images, and novels may further include traffic categories such as fantasy, martial arts, and romance.

In an embodiment, the logic information of the first data may be determined in response to a user access request and sent to the data processing party.

In an optional implementation, step S510 includes the following steps: the logic information of the first data is sent to a data controller in the data processing party to cause the data controller to determine metadata of the first data according to the logic information of the first data; and the metadata of the first data is sent to a database in the data processing party to cause the database to determine the first physical addresses according to the metadata of the first data.

The metadata of the first data may be metadata logic information of the first data. The metadata of the first data is different, and the first data shards may be different, that is, the first physical addresses are different.

In an optional implementation, the metadata of the first data is version information of the data shards in the physical data group associated with the first data. In an embodiment, after each readjustment of the physical resources of the physical data group, the version information of the data shards in the physical data group is updated.

In step S520, the first data is ordered according to the first physical addresses.

In an optional implementation, the first physical addresses include a full physical address of a full data shard in a physical data group associated with the first data and an incremental physical address of an incremental data shard in the physical data packet associated with the first data, and accordingly, step S520 includes the following steps: the first data is acquired according to the incremental physical address; if the first data fails to be acquired, the first data is acquired according to the full physical address; and the acquired first data is ordered.

In an embodiment, if the first data is hot spot data, the incremental data shard is pre-built for the first data, and the ordering tool preferentially accesses the incremental data shard. If the first data fails to be acquired from the incremental data shard, the full data shard is accessed. If the first data is successfully acquired from the incremental data shard, there is no need to access the full data shard, thereby improving the data access efficiency. It is to be noted that the first physical addresses may also only include the incremental physical address of the incremental data shard.

According to the technical scheme of the embodiment of the present application, the ordering tool accesses the data according to the relationship between the new data forms, which can improve the data access efficiency, and the incremental data shard of the hot spot data is accessed preferentially, thereby improving the access efficiency of the hot spot data and reducing the resource occupation.

Figure 6:
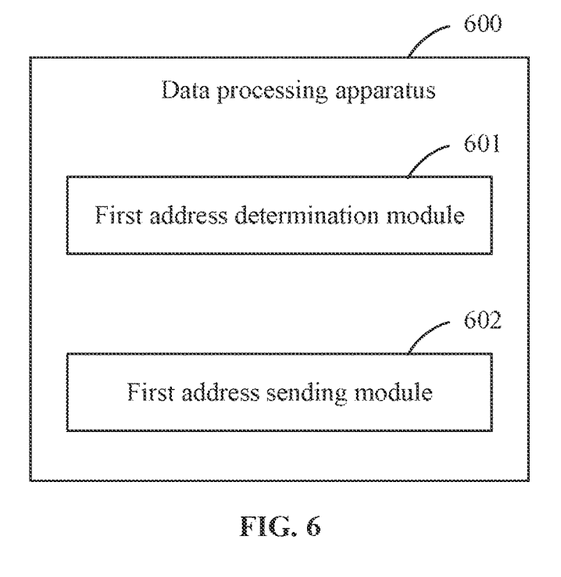
FIG. 6 is a structure diagram of a data processing apparatus according to an embodiment of the present application.

FIG. 6 is a structure diagram of a data processing apparatus according to an embodiment of the present application. With reference to FIG. 6, the embodiment of the present application discloses a data processing apparatus 600. The apparatus 600 may be configured in the data processing party and may include a first address determination module 601 and a first address sending module 602.

The first address determination module 601 is configured to determine, according to logic information of first data acquired from an ordering tool, first physical addresses, where the first physical addresses are physical addresses of data shards in a physical data group associated with the first data.

The first address sending module 602 is configured to send the first physical addresses to the ordering tool to cause the ordering tool to order the first data according to the first physical addresses.

In an embodiment, data shards in the same physical data group are stored in different data stores, and data shards in different physical data groups are stored in the same data store.

In an embodiment, the first address determination module 601 includes a first metadata unit and a first address determination unit.

The first metadata unit is configured to determine, through a data controller, metadata of the first data according to the logic information of the first data acquired from the ordering tool and send the metadata of the first data to the ordering tool.

The first address determination unit is configured to determine, through a database, the first physical addresses according to the metadata of the first data acquired from the ordering tool.

In an embodiment, the metadata of the first data is version information of the data shards in the physical data group associated with the first data.

In an embodiment, the first physical addresses include a full physical address of a full data shard in the physical data group associated with the first data and an incremental physical address of an incremental data shard in the physical data group associated with the first data, and used for causing the ordering tool to order the first data according to the incremental physical address and the full physical address.

In an embodiment, the apparatus 600 further includes a second address determination module and a second address sending module.

The second address determination module is configured to determine, according to logic information of second data acquired from a data builder, second physical addresses, where the second physical addresses are physical address of data shards in a physical data group associated with the second data.

The second address sending module is configured to send the second physical addresses to the data builder to cause the data builder to write the second data according to the second physical addresses.

In an embodiment, the second address determination module includes a second metadata unit and a second address determination unit.

The second metadata unit is configured to determine, through a store controller and according to the logic information of the second data acquired from the data builder, metadata of the second data, and send the metadata of the second data to the data builder.

The second address determination unit is configured to determine, through a database and according to the metadata of the second data acquired from the data builder, the second physical addresses.

In an embodiment, the apparatus 600 further includes a resource adjustment module.

The resource adjustment module is configured to, if a data storage resource adjustment event is detected, update a storage resource of the physical data group, and update the physical addresses of the data shards in the physical data group.

In an embodiment, the resource adjustment module is configured to: if it is detected that a resource utilization of an original data shard in the physical data group is greater than a first resource utilization threshold, create a new associated data shard for the original data shard in the physical data group; and divide data in the original data shard into the original data shard and the new data shard, and use a physical address of the original data shard and a physical address of the new data shard as the physical addresses of the data shards in the physical data group.

In an embodiment, the resource adjustment module is configured to: if it is detected that a resource utilization of the data shards in the physical data group is less than a second resource utilization threshold, merge data of at least one data shard of the data shards in the physical data group into another data shard of the data shards in the physical data group, and delete a physical address of the at least one data shard from the physical addresses of the data shards in the physical data group.

In an embodiment, the resource adjustment module is configured to: if hot spot data exists in the physical data group, detect the data storage resource adjustment event; create an incremental data shard for the physical data group, write the hot spot data into the incremental data shard, and use an original data shard in the physical data group as a full data shard in the physical data group; and add a physical address of the incremental data shard into the physical data group.

In an embodiment, the resource adjustment module is configured to: if it is detected that a resource utilization of a data store is greater than a third resource utilization threshold, create a new data store; and create a new data shard in the physical data group in the new data store, and use a physical address of the new data store as a physical address of the new data shard in the physical data group.

According to the technical scheme of the embodiment of the present application, the data processing party cooperates with the ordering tool and the data builder, respectively, and performs data access and data building in data forms such as virtual data groups, physical data groups, and data shards, which can improve the data processing efficiency and the convenience of the data processing. Moreover, when the data scale changes or the user flow changes, the elastic and self-adaptive data adjustment is performed, thereby improving the utilization of data resources and reducing the machine cost.

Figure 7:
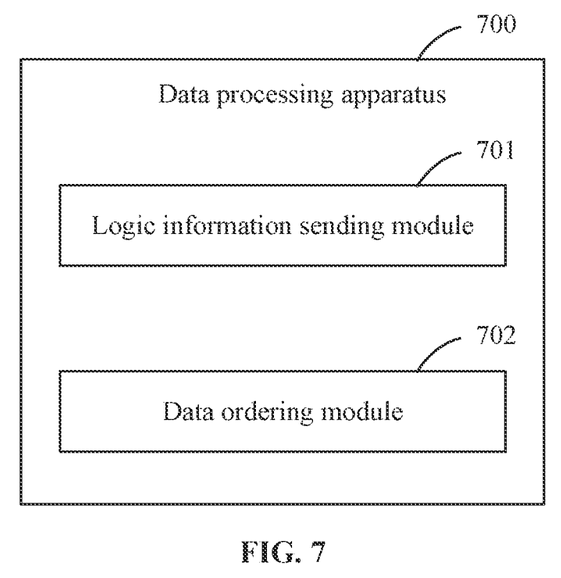
FIG. 7 is a structure diagram of a data processing apparatus according to an embodiment of the present application.

FIG. 7 is a structure diagram of a data processing apparatus according to an embodiment of the present application. With reference to FIG. 7, the embodiment of the present application discloses a data processing apparatus 700. The apparatus 700 may be configured in the ordering tool and may include a logic information sending module 701 and a data ordering module 702.

The logic information sending module 701 is configured to send logic information of first data to a data processing party to cause the data processing party to determine first physical addresses according to the logic information of the first data, where the first physical addresses are physical addresses of data shards in a physical data group associated with the first data.

The data ordering module 702 is configured to order, according to the first physical addresses, the first data.

In an embodiment, the logic information sending module 701 includes a logic information sending unit and a metadata sending unit.

The logic information sending unit is configured to send the logic information of the first data to a data controller in the data processing party to cause the data controller to determine metadata of the first data according to the logic information of the first data.

The metadata sending unit is configured to send the metadata of the first data to a database in the data processing party to cause the database to determine the first physical addresses according to the metadata of the first data.

In an embodiment, the metadata of the first data is version information of the data shards in the physical data group associated with the first data.

In an embodiment, the first physical addresses include a full physical address of a full data shard in a physical data group associated with the first data and an incremental physical address of an incremental data shard in the physical data packet associated with the first data.

Accordingly, the data ordering module 702 is configured to acquire the first data according to the incremental physical address; if the first data fails to be acquired, acquire the first data according to the full physical address; and order the acquired first data.

According to the technical scheme of the embodiment of the present application, the ordering tool accesses the data according to the relationship between the new data forms, which can improve the data access efficiency, and the incremental data shards of the hot spot data are accessed preferentially, thereby improving the access efficiency of the hot spot data and reducing the resource occupation.

Figure 8:
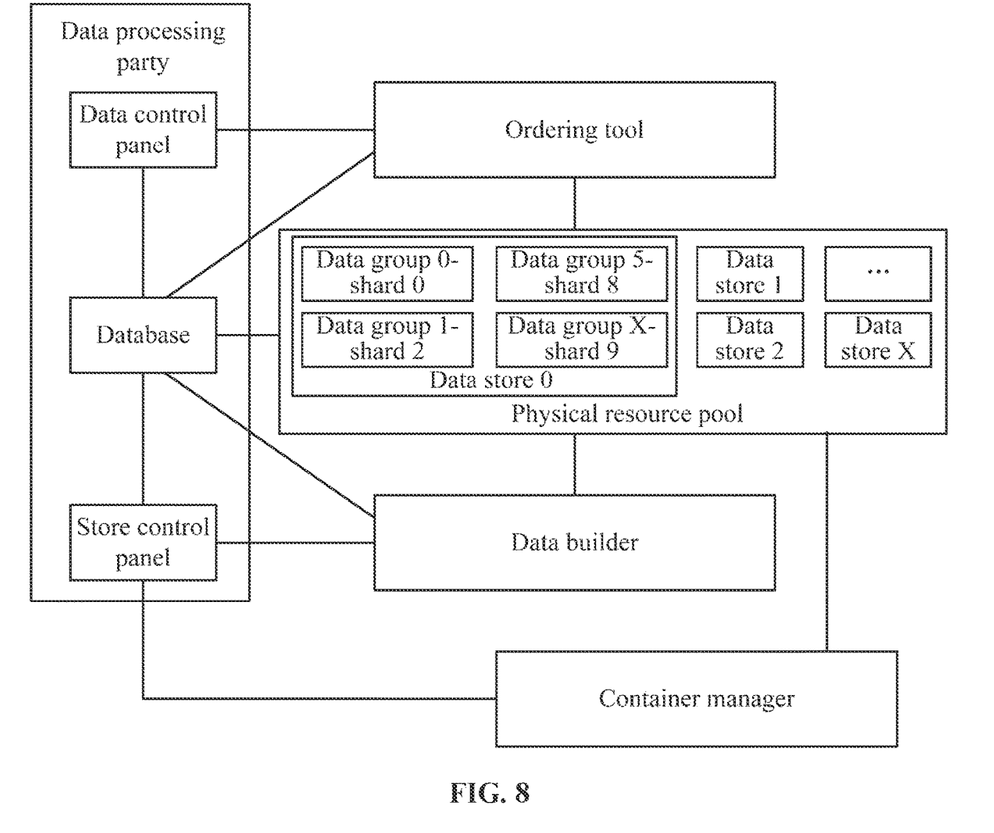
FIG. 8 is a structure diagram of a data processing system according to an embodiment of the present application.

FIG. 8 is a structure diagram of a data processing system according to an embodiment of the present application. With reference to FIG. 8, the data processing system includes an ordering tool, a data builder, a data processing party, a physical resource pool, and a container manager. The data processing party includes a data controller, a database, and a store controller.

The ordering tool may be an ordering module in a search engine or in a push engine. The data builder is configured to build content data, that is, to build index data. The container manager is configured to manage a data container.

In the initialization process of the traffic field, the data controller is configured to build a unique virtual data group for the traffic field, build a unique physical data group for each traffic category in the traffic field, and allocate data shards to a physical data group associated with the traffic category according to the amount of data of the traffic category. The data controller may write the preceding resource allocation information into the database. The store controller deploys physical resources according to the resource allocation information in the database. In an embodiment, the store controller cooperates with the container manager to determine a data store of each data shard in the resource allocation information, that is, to determine a physical address of each data shard, and may also write physical resource deployment information into the database for subsequent data writing or data access.

In the data writing stage, the content builder sends logic information of to-be-written data to the store controller. The store controller returns metadata of the to-be-written data, such as version information of a physical shard associated with the to-be-written data. The content builder acquires a physical address of the to-be-written data from the database by using metadata, that is, the content builder acquires a physical address of each data shard in the physical data group associated with the to-be-written data. The content builder writes the to-be-written data into any one of data shards according to the physical address of each data shard and based on load balance.

In the data access stage, the ordering tool sends logic information of to-be-accessed data to the data controller. The data controller returns metadata of the to-be-accessed data, such as version information of a physical shard associated with the to-be-accessed data. The ordering tool acquires a physical address of the to-be-accessed data from the database by using the metadata, recalls the to-be-accessed data by using the physical address, and orders the recalled data.

The data controller or the store controller detects that the data resource needs to be expanded or shrunk. In an embodiment, if it is detected that the resource utilization of the data shards in the physical data group reaches an upper limit, data shards are added into the physical data group. If it is detected that the resource utilization of the data shards in the physical data group is less than a lower limit, data shards are reduced for the physical data group. If it is detected that data storage space is insufficient, a new data store may also be added.

With the decoupling of data management and physical storage, the cloud native architecture of data and the fully automatic data management mode are achieved, thereby reducing the machine cost and greatly reducing the operation and maintenance cost. According to the characteristics of data, an appropriate storage medium and storage management mode are selected according to the actual requirements of online access. When the data scale and user consumption flow change greatly, the elastic and self-adaptive data adjustment is performed. On the premise of ensuring high availability and high performance of the system, the machine cost can be greatly reduced without relying on labor.

According to the technical scheme of the embodiment of the present application, the data processing party cooperates with the ordering tool and the data builder, respectively, and performs data access and data building in data forms such as virtual data groups, physical data groups, and data shards, which can improve the data processing efficiency and the convenience of the data processing. Moreover, when the data scale changes or the user flow changes, in the multi-heterogeneous scenario, the elastic and self-adaptive data adjustment is performed with great difference between the flow and the amount of data, thereby improving the utilization of data resources and reducing the machine cost.

According to the embodiments of the present application, the present application further provides an electronic device and a readable storage medium.

Figure 9:
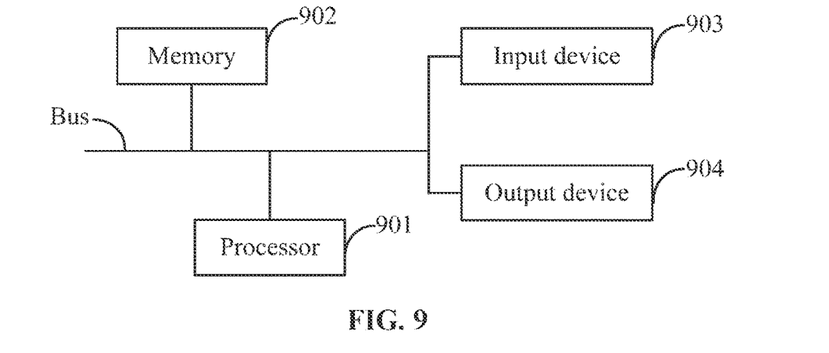
FIG. 9 is a block diagram of an electronic device for implementing a data processing method in an embodiment of the present application.

FIG. 9 is a block diagram of an electronic device for implementing a data processing method in an embodiment of the present application. The electronic device is intended to represent various forms of digital computer, for example, a laptop computer, a desktop computer, a worktable, a personal digital assistant, a server, a blade server, a mainframe computer and another applicable computer. The electronic device may also represent various forms of mobile device, for example, a personal digital assistant, a cellphone, a smartphone, a wearable device and another similar computing device. Herein the shown components, the connections and relationships between these components, and the functions of these components are illustrative only and are not intended to limit the implementation of the present application as described and/or claimed herein.

As shown in FIG. 9, the electronic device includes one or more processors 901, a memory 902, and interfaces for connecting various components, including a high-speed interface and a low-speed interface. The various components are interconnected to each other by different buses and may be mounted on a common mainboard or in other manners as desired. The processor may process instructions executed in the electronic device, including instructions stored in or on the memory to make graphic information of a graphical user interface (GUI) displayed on an external input/output device (for example, a display device coupled to an interface). In other implementations, if required, multiple processors and/or multiple buses may be used with multiple memories. Similarly, multiple electronic devices may be connected, each providing some necessary operations (for example, serving as a server array, a set of blade servers or a multi-processor system). FIG. 9 shows one processor 901 by way of example.

The memory 902 is the non-transitory computer-readable storage medium provided in the present application. The memory has instructions executable by at least one processor stored thereon to cause the at least one processor to perform the data processing method provided in the present application. The non-transitory computer-readable storage medium of the present application has computer instructions stored thereon, and the computer instructions are used for causing a computer to perform the data processing method provided in the present application.

The memory 902 as a non-transitory computer-readable storage medium is configured to store a non-transitory software program, a non-transitory computer-executable program, and modules, for example, program instructions/modules corresponding to the data processing method provided in embodiments of the present application (for example, the first address determination module 601 and the first address sending module 602 shown in FIG. 6; in another example, the logic information sending module 701 and the data ordering module 702 as shown in FIG. 7). The processor 901 executes non-transitory software programs, instructions, and modules stored in the memory 902 to execute the various function applications and data processing of a server, that is, to implement the data processing method provided in the preceding method embodiments.

The memory 902 may include a program store and a data store, where the program store may store an operating system and an application program required by at least one function while the data store may store data created according to use of an electronic device. Additionally, the memory 902 may include a high-speed random-access memory and may also include a non-transient memory, for example, at least one disk memory, a flash memory or another non-transient solid-state memory. In some embodiments, the memory 902 optionally includes memories which are remotely disposed relative to the processor 901 and these remote memories may be connected to the electronic device via a network. Examples of the preceding network include, but are not limited to, the Internet, an intranet, a local area network, a mobile communication network and a combination thereof.

The electronic device for the data processing method may further include an input device 903 and an output device 904. The processor 901, the memory 902, the input device 903, and the output device 904 may be connected by a bus or in other manners. FIG. 9 uses connection by a bus as an example.

The input device 903 may receive input number or character information and generate key signal input related to user settings and function control of the electronic device for data processing. The input device 903 may include, for example, a touchscreen, a keypad, a mouse, a trackpad, a touchpad, a pointing stick, one or more mouse buttons, a trackball or a joystick. The output device 904 may include, for example, a display device, an auxiliary lighting device (for example, a light-emitting diode (LED)) or a haptic feedback device (for example, a vibration motor). The display device may include, but is not limited to, a liquid-crystal display (LCD), an LED display, and a plasma display. In some implementations, the display device may be a touchscreen.

Various implementations of the systems and techniques described herein may be implemented in digital electronic circuitry, integrated circuitry, an application-specific integrated circuit (ASIC), computer hardware, firmware, software and/or a combination thereof. The implementations may include implementations in one or more computer programs. The one or more computer programs may be executable and/or interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device and the at least one output device.

These computing programs (also referred to as programs, software, software applications or codes) include machine instructions of a programmable processor. These computing programs may be implemented in a high-level procedural and/or object-oriented programming language and/or in an assembly/machine language. As used herein, the term "machine-readable medium" and "computer-readable medium" refer to any computer program product, device and/or apparatus (for example, a magnetic disk, an optical disk, a memory or a programmable logic device (PLD)) for providing machine instructions and/or data for a programmable processor, including a machine-readable medium for receiving machine instructions as machine-readable signals. The term "machine-readable signal" refers to any signal used in providing machine instructions and/or data for a programmable processor.

In order to provide the interaction with a user, the systems and techniques described herein may be implemented on a computer. The computer has a display device (for example, a cathode-ray tube (CRT) or an LCD monitor) for displaying information to the user and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a user computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship to each other.

According to the technical scheme of the embodiment of the present application, the data processing party cooperates with the ordering tool and the data builder, respectively, and performs data access and data building in data forms such as virtual data groups, physical data groups, and data shards, which can improve the data processing efficiency and the convenience of the data processing. Moreover, when the data scale changes or the user flow changes, the elastic and self-adaptive data adjustment is performed, thereby improving the utilization of data resources and reducing the machine cost.

The scope of the present application is not limited to the preceding implementations. It is to be understood by those skilled in the art that various modifications, combinations, sub-combinations, and substitutions may be made depending on design requirements and other factors.

What is claimed is:

1. A data processing method, executed by an electronic device comprising a data processing party, comprising:
    receiving, by the data processing party, logic information of first data from an ordering tool, and determining, by the data processing party according to the logic information, first physical addresses of data shards in a physical data group associated with the first data, wherein the first data is forward index data or reverse index data of traffic content, and each of the data shards is configured to store a set of index data; and
    sending, by the data processing party, the first physical addresses to the ordering tool to cause the ordering tool to recall the first data from the data shards according to the first physical addresses and order the recalled first data;
    wherein a physical source pool comprises a plurality of data stores, and each of the plurality of data stores stores one data shard or more data shards, wherein the stored data shards belong to at least two physical data groups, and each data shard in a same physical data group is stored in a respective one data store.

2. The method according to claim 1, wherein determining, by the data processing party according to the logic information, the first physical addresses of the data shards in the physical data group associated with the first data comprises:
    determining, through a data controller and according to the logic information, metadata of the first data, and sending the metadata of the first data to the ordering tool; and
    determining, through a database and according to the metadata of the first data received from the ordering tool, the first physical addresses.

3. The method according to claim 2, wherein the metadata of the first data is version information of the data shards in the physical data group associated with the first data.

4. The method according to claim 1, wherein the first physical addresses comprise a full physical address of a full data shard in the physical data group associated with the first data and an incremental physical address of an incremental data shard in the physical data group associated with the first data, and are used for causing the ordering tool to order the first data according to the incremental physical address and the full physical address.

5. The method according to claim 1, further comprising:
    determining, according to logic information of second data acquired from a data builder, second physical addresses, wherein the second physical addresses are physical address of data shards in a physical data group associated with the second data; and
    sending the second physical addresses to the data builder to cause the data builder to write the second data according to the second physical addresses.

6. The method according to claim 5, wherein determining, according to the logic information of the second data acquired from the data builder, the second physical addresses comprises:
    determining, through a store controller and according to the logic information of the second data acquired from the data builder, metadata of the second data, and sending the metadata of the second data to the data builder; and
    determining, through a database and according to the metadata of the second data acquired from the data builder, the second physical addresses.

7. The method according to claim 1, further comprising:
    in response to detecting a data storage resource adjustment event, updating a storage resource of the physical data group, and updating the physical addresses of the data shards in the physical data group.

8. The method according to claim 7, wherein in response to detecting the data storage resource adjustment event, updating the storage resource of the physical data group, and updating the physical addresses of the data shards in the physical data group comprises:
    in response to detecting that a resource utilization of an original data shard in the physical data group is greater than a first resource utilization threshold, creating a new data shard associated with the original data shard in the physical data group; and
    storing part of data of the original data shard into both of the original data shard and the new data shard associated with the original data shard, and using a physical address of the original data shard and a physical address of the new data shard as the physical addresses of the data shards in the physical data group.

9. The method according to claim 7, wherein in response to detecting the data storage resource adjustment event, updating the storage resource of the physical data group, and updating the physical addresses of the data shards in the physical data group comprises:
    in response to detecting that a resource utilization of the data shards in the physical data group is less than a second resource utilization threshold, merging data of at least one data shard of the data shards in the physical data group into another data shard of the data shards in the physical data group, and deleting a physical address of the at least one data shard from the physical addresses of the data shards in the physical data group.

10. The method according to claim 7, wherein in response to detecting the data storage resource adjustment event, updating the storage resource of the physical data group, and updating the physical addresses of the data shards in the physical data group comprises:
    in response to determining that hot spot data exists in the physical data group, detecting the data storage resource adjustment event;

creating an incremental data shard for the physical data group, writing the hot spot data into the incremental data shard, and using an original data shard in the physical data group as a full data shard in the physical data group; and adding a physical address of the incremental data shard into the physical data group.

11. The method according to claim 7, wherein in response to detecting the data storage resource adjustment event, updating the storage resource of the physical data group, and updating the physical addresses of the data shards in the physical data group comprises:

in response to detecting that a resource utilization of a data store is greater than a third resource utilization threshold, creating a new data store; and creating a new data shard of the physical data group in the new data store, and using a physical address of the new data store as a physical address of the new data shard in the physical data group.

12. A non-transitory computer-readable storage medium having computer instructions stored thereon, wherein the computer instructions are used for causing a computer to perform the method of claim 1.

13. A data processing method, executed by an electronic device comprising an ordering tool, comprising:

sending, by the ordering tool, logic information of first data to a data processing party, and receiving, by the ordering tool, first physical addresses determined by the data processing party according to the logic information, wherein the first physical addresses are physical addresses of data shards in a physical data group associated with the first data, the first data is forward index data or reverse index data of traffic content, and each of the data shards is configured to store a set of index data; and recalling, by the ordering tool according to the first physical addresses, the first data from the data shards, and ordering, by the ordering tool, the recalled first data;

wherein a physical source pool comprises a plurality of data stores, and each of the plurality of data stores stores one data shard or more data shards, wherein the stored data shards belong to at least two physical data groups, and each data shard in a same physical data group is stored in a respective one data store.

14. The method according to claim 13, wherein sending, by the ordering tool, the logic information of the first data to the data processing party, and receiving, by the ordering tool, the first physical addresses determined by the data processing party according to the logic information comprises:

sending the logic information of the first data to a data controller in the data processing party to cause the data controller to determine metadata of the first data according to the logic information of the first data; and sending the metadata of the first data to a database in the data processing party to cause the database to determine the first physical addresses according to the metadata of the first data.

15. The method according to claim 14, wherein the metadata of the first data is version information of the data shards in the physical data group associated with the first data.

16. The method according to claim 13, wherein the first physical addresses comprise a full physical address of a full data shard in the physical data group associated with the first data and an incremental physical address of an incremental data shard in the physical data group associated with the first data; and wherein recalling, according to the first physical addresses, the first data from the data shards, and ordering, by the ordering tool, the recalled first data comprises:

acquiring the first data according to the incremental physical address, and in response to determining that the first data fails to be acquired, acquiring the first data according to the full physical address; and ordering the acquired first data.

17. An electronic device, comprising:

at least one processor; and a memory communicatively connected to the at least one processor;

wherein the memory has instructions executable by the at least one processor stored thereon to cause the at least one processor to perform:

receiving logic information of first data from an ordering tool, and determining, according to the logic information, first physical addresses of data shards in a physical data group associated with the first data, wherein the first data is forward index data or reverse index data of traffic content, and each of the data shards is configured to store a set of index data; and sending the first physical addresses to the ordering tool to cause the ordering tool to recall the first data from the data shards according to the first physical addresses and order the recalled first data.

\* \* \* \* \*